United States Patent [19]

Dillman et al.

[11] Patent Number: 5,536,772

[45] Date of Patent: * Jul. 16, 1996

[54] RADIATION CURED CONJUGATED DIENE BLOCK COPOLYMER COMPOSITIONS

[75] Inventors: Steven H. Dillman, Houston; James R. Erickson, Katy, both of Tex.

[73] Assignee: Shell Oil Company, Houston, Tex.

[*] Notice: The portion of the term of this patent subsequent to Jul. 20, 2010, has been disclaimed.

[21] Appl. No.: 79,478

[22] Filed: Jun. 18, 1993

[51] Int. Cl.$^6$ .................................................. C08K 5/01
[52] U.S. Cl. ...................... 524/483; 522/111; 522/113; 522/125
[58] Field of Search ........................ 522/111, 113, 522/125; 524/483

[56] References Cited

U.S. PATENT DOCUMENTS

| | | | |
|---|---|---|---|
| 3,341,617 | 9/1967 | Schleimer et al. | 260/680 |
| 3,551,518 | 12/1970 | Pornin | 260/836 |
| 3,555,112 | 1/1971 | Winkler | 260/876 |
| 3,607,977 | 9/1971 | Taylor et al. | 260/876 |
| 3,607,982 | 9/1971 | Winkler et al. | 260/880 |
| 3,652,732 | 3/1972 | Makowski et al. | 260/880 |
| 3,699,184 | 10/1972 | Taylor et al. | 260/836 |
| 3,714,297 | 1/1973 | Blaise et al. | 260/890 |
| 3,899,474 | 8/1975 | Goldenburg et al. | 260/94.7 |
| 3,970,608 | 7/1976 | Furukawa et al. | 526/19 |
| 4,051,199 | 9/1977 | Udipi et al. | 260/880 |
| 4,086,298 | 4/1978 | Fahrbach et al. | 260/880 |
| 4,091,195 | 5/1978 | Vitek | 526/52 |
| 4,131,653 | 12/1978 | Hsieh et al. | 260/880 B |
| 4,131,725 | 12/1978 | Udipi | 526/56 |
| 4,135,037 | 1/1979 | Udipi et al. | 428/414 |
| 4,237,245 | 12/1980 | Halasa et al. | 525/272 |
| 4,291,114 | 9/1981 | Berggren et al. | 522/110 |
| 4,341,672 | 7/1982 | Hsieh et al. | 523/451 |
| 4,417,029 | 11/1983 | Milkovich | 525/314 |
| 4,769,416 | 9/1988 | Gelling et al. | 525/90 |
| 4,878,349 | 11/1989 | Hoxmeier | 525/332.8 |
| 5,001,199 | 3/1991 | Hoxmeir | 525/338 |
| 5,034,470 | 7/1991 | Geiser et al. | 525/36 |
| 5,039,755 | 8/1991 | Chamberlain et al. | 525/338 |
| 5,066,728 | 11/1991 | Audett | 525/314 |
| 5,104,921 | 4/1992 | Erickson et al. | 524/274 |
| 5,115,008 | 5/1992 | Sasaki | 524/271 |
| 5,149,895 | 9/1992 | Coolbaugh et al. | 585/507 |
| 5,210,359 | 5/1993 | Coolbaugh et al. | 585/507 |
| 5,229,464 | 7/1993 | Erickson et al. | 525/338 |

FOREIGN PATENT DOCUMENTS

| | | |
|---|---|---|
| 0295026 | 12/1988 | European Pat. Off. . |
| 0396780A1 | 11/1990 | European Pat. Off. . |
| 0438287 | 7/1991 | European Pat. Off. . |
| 0441485A2 | 8/1991 | European Pat. Off. . |
| 219799 | 3/1985 | Germany . |
| 249029 | 8/1987 | Germany . |
| 256709 | 5/1988 | Germany . |
| 61-042504 | 3/1986 | Japan . |
| 61-136563 | 6/1986 | Japan . |
| 01115978 | 5/1989 | Japan . |

OTHER PUBLICATIONS

"Experimental Thermoplastic Rubbers for Enhanced Radiation Cross–Linking of Hot Melt PSA's," by J. R. Erickson pub. May, 1985.

"Radiation Curing of PSA's Based on Thermoplastic Rubbers," by D. J. St. Clair, Mar. 1980, Adhesives Age.

Hercules, Inc., *Piccolyte® A115, A125, and A135—High-–Softening–Point Terpene Hydrocarbon Resins*, No. 7189–8, (1992).

Arizona Chemistry, *ZONATAC® Resins ZONATAC® Lite Resins*, (1992).

*Primary Examiner*—Joseph L. Schofer
*Assistant Examiner*—Peter D. Mulcahy
*Attorney, Agent, or Firm*—Donald F. Haas

[57] ABSTRACT

This invention provides a radiation cured composition which is curable at low levels of radiation. The composition comprises a crosslinked unsaturated epoxidized diene polymer and a terpene tackifying resin. The invention also encompasses adhesive, coating and sealant compositions made with the above composition.

2 Claims, No Drawings

RADIATION CURED CONJUGATED DIENE BLOCK COPOLYMER COMPOSITIONS

BACKGROUND OF THE INVENTION

This invention relates to radiation cured conjugated diene block copolymer compositions which are cured at low radiation doses. Further, the invention relates to unsaturated crosslinked epoxidized polymer adhesive, coating, and sealant compositions.

Curing of adhesives based on conjugated diolefins and, optionally, vinyl aromatics has increased the range of service properties for such adhesives. Radiation curing of polymers to make such adhesives is known. Curing of coatings and sealants based on these polymers has reduced solvent content required for such products. This curing causes covalent crosslinking of the polymerized conjugated diolefins which is evidenced by a high gel content of the crosslinked polymer. Before crosslinking, the polymers are melt and solution processable but after crosslinking, the gel cannot be processed as melts or in solution. Crosslinking therefore enhances solvent resistance and improves elevated temperature shear properties, toughness and cohesion. Compositions can therefore be applied to a substrate in a melt or from solution and then crosslinked to form a superior adhesive, coating or sealant. However, improvements in the adhesives, coatings and sealants could be made if the adhesives could be cured at lower dosages of radiation.

Further, the known curable adhesives, sealants and coatings which are based on vinyl aromatics and conjugated diolefins do not have particularly good long term heat, weather and ultraviolet stability due to the need to utilize unhydrogenated polymers. The known vinyl aromatic-conjugated diolefin based adhesives, coatings and sealants which are curable are unhydrogenated polymers. Hydrogenation is known to improve long term heat, weather and ultraviolet stability, but it removes the double bonds which are needed to effect the curing by radiation crosslinking. Such curing methods are not effective when the polymers are hydrogenated. The requirement for this unsaturation is particularly evident when typical tackifiers are present in the compositions because their presence generally inhibits crosslinking of the polymer.

It is an object of the present invention to provide a block copolymer composition which can be crosslinked by low doses of radiation, and which is easily processable in the melt or at high solids content before crosslinking but has a high gel content after crosslinking. Further, it is an object of this invention to provide an adhesive, coating or sealant composition which is based on this crosslinked block copolymer.

SUMMARY OF THE INVENTION

This invention provides a radiation crosslinked polymeric composition which is capable of being radiation cured at low doses of radiation, i.e. when electron beam radiation is used, at less than 5 Mrads. The composition is comprised of a polymer comprising diolefin monomer units and epoxy functionality and a terpene tackifying resin. The polymers are unsaturated epoxidized conjugated diene polymers. The terpene tackifying resin may also be epoxidized. This composition is curable by electron beam radiation at less than 5 Mrads and is also curable by other types of radiation, such as ultraviolet, at low doses. The cured crosslinked polymeric composition is an excellent adhesive, sealant or coating composition either by itself or when formulated with other ingredients. The preferred epoxidized diene polymers of this invention are epoxidized such that there is between 0.1 and 3 milliequivalents of epoxide per gram of polymer.

DETAILED DESCRIPTION OF THE INVENTION

Polymers containing ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like, but it also may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. The conjugated diolefins which may be used in the present invention include monomers which do and monomers which do not form a polymer wherein the residual aliphatic couple bonds are positioned between a tertiary carbon atom and another type of carbon atom (TU sites). Examples of monomers that do provide TU sites after polymerization include isoprene (2-methyl-,1,3-butadiene) 2-ethyl-1,3-butadiene, 2propyl-1, 3-butadiene, 2-butyl-1,3-butadiene, 2-butyl-1,3-butadiene, 2-pentyl-1,3-butadiene (2-amyl-1,3-butadiene), 2-hexyl-1, 3-butadiene, 2-heptyl-1,3-butadiene, 2-octyl-1,3-butadiene, 2-nonyl-1,3-butadiene,2-decyl-1,3-butadiene, 2-dodecyl1,3-butadiene, 2-tetradecyl-1,3-butadiene, 2-hexadecyl-1,3-butadiene, 2-isoamyl- 1,3-butadiene, 2-phenyl-1,3-butadiene, 2-methyl-1,3-pentadiene, 2-methyl1,3-hexadiene, 2-methyl-1,3-heptadiene, 2-methyl-13-octadiene, 2methyl-6-methylene-2,7-octadiene (myrcene), 2-methyl-1,3-nonyldiene, 2-methyl1,3-decyldiene, and 2-methyl-1,3-dodecyldiene, as well as the 2-ethyl, 2-propyl, 2-butyl, 2-bentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Those that do not form polymers wherein the residual aliphatic double bonds are positioned between a tertiary carbon atom and another carbon atom include 1,3-butadiene, piperylene, 4,5-diethyl-1,3-octadiene and the like. Alkenyl aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

These polymers are epoxidized. It is preferred that the epoxidation take place only to the extent that about 0.1 to about 3 milliequivalents of epoxide per gram of polymer (0.1 to 3 Meq epoxide/g) are generated. Hence, the preferred epoxidized polymer has an epoxide equivalent weight of between abut 10,000 and about 333. The polymers may then be crosslinked through at least some of the epoxy functionality, preferably, by radiation.

Preferred block copolymers which are useful in the present invention have the formula

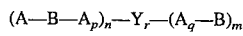

wherein Y is a coupling agent or coupling monomers, and wherein A and B are polymer blocks which may be homopolymer blocks of conjugated diolefin monomers, copolymer blocks of conjugated diolefin monomers or copolymer blocks of diolefin monomers and monoalkenyl aromatic hydrocarbon monomers. These polymers are described in more detail in allowed copending application Ser. No. 692,839, filed Apr. 29, 1991, now U.S. Pat. No. 5,229,464 entitled "Viscous Conjugated Diene Block Copolymers," which is herein incorporated by reference. Generally, the A blocks should have a greater concentration of more highly substituted aliphatic double bonds than the B blocks have. The A blocks will have a greater concentration of di-, tri-, or tetra-substituted aliphatic double bonds. For example, in one embodiment, the A blocks will have a greater number of tertiary unsaturation (TU) sites per unit of block mass than the B blocks, where a TU site is defined to be an aliphatic double bond (ADB) between a tertiary carbon atom and either a primary or secondary carbon atom. The A blocks have a molecular weight of from about 100 to about 3,000 and the B blocks have a molecular weight of from about 1000 to about 15,000. n is greater than 0, r is 0 or 1, m is greater than or equal to 0, and n+m ranges from 1 to 100. p and q may be 0 or 1. When either p or q or both are 1, extra TU sites are available in the interior of the polymer chain. By way of example, polymer block A could be polyisoprene having about 14.7 milliequivalents of residual ADB's per gram, all of which would be TU sites (14.7 Meq TU/g), and polymer block B could be polybutadiene having 18.5 milliequivalents of residual ADB's per gram, none of which would be TU sites (0 Meq TU/g).

As described above, in general, the advantages of the present invention are achieved by utilizing an A block which contains more highly substituted aliphatic double bonds than the B blocks which should contain less highly substituted double bonds. One preferred specific example of this is the case where the A blocks are formed from isoprene monomer and the B blocks are formed from butadiene monomer. However, another special case is the situation wherein the A blocks are formed from 1,4-polybutadiene monomer and the B blocks are formed from 1,2-polybutadiene monomer. Another special case is wherein the A blocks are formed from 2,3-dimethyl butadiene (tetra-substituted) and the B blocks are formed from either isoprene or butadiene.

The present invention also encompasses polymers which have midblocks formed of monoalkenyl aromatic hydrocarbon monomers, preferably styrene. In this situation, the A blocks would be conjugated dienes containing di-, tri- and/or tetra-substituted aliphatic double bonds and the B blocks would be formed of the monoalkenyl aromatic hydrocarbon. This type of polymer is not a rubbery polymer, but rather is hard and rigid. This type of polymer can be cured in situ to give a material with reinforcing crosslinks.

The polymers described immediately above are relatively low molecular weight low viscosity materials. Higher molecular weight higher viscosity epoxidized polymers may also be used to advantage according to the present invention. Indeed, the epoxidized diene block copolymers of the present invention may have molecular weights of from about 3000 to about 3,000,000. Lower molecular weight materials require excessive crosslinking whereas higher molecular weight materials are very difficult to apply to a substrate by melt or other means. Blocks comprising predominantly conjugated diolefin monomer units generally will have molecular weights between about 300 and about 200,000 prior to epoxidation and, if present, blocks comprising predominantly aromatic monomer units will have molecular weights between about 500 and about 50,000 because polymers built from larger blocks are very difficult to apply and smaller blocks fail to adequately localize covalent or physical crosslinking.

Useful randomly epoxidized star polymers are described in allowed copending application Ser. No. 901,349, filed Jun. 19, 1992, now U.S. Pat. No. 5,247,026 entitled "Randomly Epoxidized Small Star Polymers," which is herein incorporated by reference. That application describes randomly epoxidized star polymers, based on at least one conjugated diolefin monomer, that contained di-, tri- and/or tetrasubstituted olefinic epoxides. The star polymers have greater than four arms or branches. Each arm has a molecular weight from 1500 to 15,000 and the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) is from 0.05 to 5 milliequivalents of epoxide per gram of polymer. In this invention, we prefer 0.1 to 3 Meq/g.

Other useful block copolymers are based on at least one conjugated diolefin monomer, contain a greater concentration of di-, or tri-, or tetrasubstituted olefinic epoxides in the exterior blocks, and lesser concentrations of these epoxides in the interior blocks of the polymer. The exterior blocks generally contain such epoxides within the concentration range of 0.2 to 10 milliequivalents of exterior block and the ratio of the concentration such epoxide groups in the exterior blocks to the concentration in the interior blocks is at least 3:1. The molecular weight of the exterior blocks ranges from 3000 to 50,000 and the molecular weight of the interior blocks ranges from 15,000 to 200,000. Such polymers are described in more detail in copending application Ser. No. 863,579, filed Apr. 3, 1992, entitled "Epoxidized Diene Elastomers for Exterior Block Crosslinking," which is herein incorporated by reference. A special case is where the exterior blocks are formed of polyisoprene polymerized under conditions that yield primarily 1,4-polyisoprene (trisubstituted) and the interior blocks are of polybutadiene (mono- or disubstituted). Another special case is where the exterior block is a random polystyrene-polyisoprene copolymer in which a majority of the polyisoprene is 1,4-polyisoprene and the interior block is polybutadiene. Such polymers give the advantage of localizing the crosslinking in the exterior blocks.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl -substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of conjugated diene monomers and alkenyl aromatic hydrocarbon monomers in a hydrocarbon solvent at a temperature between 0° and 100° C. using an alkyl lithium initiator. The living polymer chains are usually coupled by addition of divinyl monomer to form a star polymer. Additional monomers may or may not be added to grow more branches or to terminally functionalize the polymer and the living chain ends are quenched with a proton source.

Diblock molecular weights are conveniently measured by Gel Permeation Chromatography (GPC), where the GPC system has been appropriately calibrated. Polymers of known molecular weight are used to calibrate and these must be of the same molecular structure and chemical composition as the unknown diblock polymers that are measured. For anionically polymerized diblock polymers, diblock polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wave length and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

There are a wide variety of coupling agents that can be employed. Any polyfunctional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. Nos. 3,595,941; 3,468,972, 3,135,716; 3,078,254; 4,096,203 and 3,594,452 which are herein incorporated by reference. When the coupling agent has two reactive sites such as dibromoethane, the polymer will have a linear ABA structure. When the coupling agent has three or more reactive sites, such as silicon tetrachloride, the polymer will have a branched structure, such as $(AB)_n Y$. Coupling monomers are coupling agents where several monomer units are necessary for every chain end to be coupled. Divinylbenzene is the most commonly used coupling monomer and results in star polymers.

The unhydrogenated polymer is epoxidized providing 0.1 to 3 Meq/g of epoxy functionality. It is preferred that the extent of the epoxidation be from about 0.2 Meq/g to about 1.5 Meq/g because this is the best compromise between lower cost and having sufficient epoxy groups for good crosslinking.

Some of the advantages of relatively low levels of epoxidation are:

the manufacturing cost is lower because less epoxidizing agent is used;

can maintain the polymer as an elastic material because the crosslinking will not be dense;

the polymer will be more hydrophobic so water will be less of a problem;

the polymer can be formulated in conventional equipment; and the polymer is less subject to undesirable post curing.

Epoxidation of the base polymer can be effected by generally known methods such as by reaction with organic peracids which can be performed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert sol vent such as toluene, benzene, hexane, cyclohexane, methylenechloride and the like and epoxidation conducted in this new solution or can be epoxidized neat. Epoxidation temperatures on the order of about 0° to 130° C. and reaction times from about 0.1 to 72 hours may be utilized. When employing hydrogen peroxide and acetic acid together with a catalyst such as sulfuric acid, the product can be a mixture of epoxide and hydroxy ester. The use of peroxide and formic acid in the presence of a strong acid may result in diolefin polymer blocks containing both epoxide and hydroxy ester groups. Due to these side reactions caused by the presence of an acid, it is preferable to carry out the epoxidation at the lowest possible temperature and for the shortest time consistent with the desired degree of epoxidation.

Epoxidation may also be accomplished by treatment of the polymer with hydroperoxides in the presence of transition metals such as Mo, W, Cr, V and Ag. Epoxy functionality may also be created by direct oxidation of ethylenic unsaturation by $O_2$ in the presence of tetra cyanoethylene. A temperature of about 150° C. and an oxygen partial pressure of about 58 atmospheres is suitable for this reaction.

The polymers of this invention are preferably cured by ultraviolet or electron beam radiation, but radiation curing utilizing a wide variety of electromagnetic wavelength is feasible. Either ionizing radiation such as alpha, beta, gamma, X-rays and high energy electrons or non-ionizing radiation such as ultraviolet, visible, infrared, microwave and radio frequency may be used.

The most common source of alpha, beta and gamma radiation are radioactive nuclei. A ionizing radiation source with commercial polymer crosslinking application is gamma radiation that is produced from either cobalt-60 or cesium-137 radioactive nuclei. X-rays can be produced through deacceleration of high speed electrons through the electric field of an atomic nucleus.

High voltage electron accelerators are preferred over gamma radiation and certain types of X-ray processing equipment. High energy electrons produced by machine acceleration, as opposed to radioisotopes, can be applied easily to industrial processes for the following reasons: easy on-off switching capability; less shielding is required than with gamma radiation; accelerator beams are directional and less penetrating than gamma or X-rays; and electron radiation provides high dose rates, i.e. maximum penetration per unit density of material, and is well suited for on-line, high speed processing applications. Commercially available high or low energy electron-processing equipment are the Dynamitron® device, dynacote, insulating-core transformer, linear accelerator, Van de Graaff accelerator, pelletron, laddertron and linear cathode. Manufacturers of high voltage electron-accelerator equipment are High Voltage Engineering Corporation, Burlington, Mass. and Radiation Dynamics, Inc., Westbury, N.Y. Manufacturers of low energy electron beam generating equipment include American International Technologies, Inc., of Torrance, Calif.; RPC Industries of Hayward, Calif.; and Energy Sciences of Wilmington, Mass.

Ultraviolet light sources may be based on the mercury-vapor arc. Mercury is enclosed in a quartz tube and a potential is applied to electrodes at either end of the tube. The electrodes can be of mercury, iron, tungsten or other metals. The pressure in the mercury-vapor lamp may be less than 1 atm to more than 10 atm. As the mercury pressure and lamp operating temperatures are increased, the radiation becomes more intense and the width of the emission lines increases. Other UV light sources include electrodeless lamps, Xenon lamps, pulsed Xenon lamps, Argon ion lasers and Excimer lasers.

Visible light sources can be obtained from high pressure mercury arcs by addition of rare gases or metal halides, which increase the number of emission lines in the 350–600 nm region of the spectrum. Fluorescent lamps, tungsten halide lamps and visible lasers may also be utilized.

The mechanism of the radiation crosslinking is believed to be generation of cations by removal of an electron from the polymer chain. The cation then readily reacts with an epoxy group, if an epoxy group is available. This reaction results in an ether crosslink between two polymer molecules and a new cation site on a polymer which formerly contained the epoxy functionality. The new cation will either propagate, forming another either crosslink with another epoxy oxygen, or terminate by recapturing an electron.

The presence of water in the polymer composition during the radiation crosslinking is very undesirable due to the tendency of water to terminate the crosslinking. The radiation curing is therefore generally more effective if the polymeric composition is at a temperature near or above the boiling point of water at the time of the radiation curing.

The amount of radiation necessary for high gel formation varies with the thickness of the polymeric mass being irradiated, the amount of epoxy functionality, the extent to which the epoxy functionality is concentrated in specific regions within the polymeric mass and the type of radiation utilized. When electron beam radiation is utilized, radiation doses of 0.1 Mrads to 5 Mrads are preferred.

When using non-ionizing radiation it is necessary to employ a photoinitiator to initiate the crosslinking reaction. Useful photoinitiators include diaryliodonium, alkoxy-substituted diaryliodonium, triarylsulfonium, dialkylphenacylsulfonium, and dialkyl-4-hydrophenylsulfonium salts. The anions in these salts generally possess low nucleophilic character and include $SbF_6^-$, $BF_4^-$, $BF_4^-$, $PF_6^-$ and $AsF_6^-$. Specific examples include (4-octyloxyphenyl)-phenyl-iodium hexafluoroantimonate, UVI-6990 (from Union Carbide), and FX-512 (3M Company). UVI-6974, an aryl sulfonium salt from Union Carbide, is especially effective. The salts can be used alone or in conjunction with a photosensitizer to respond to long wave length UV and visible light. Examples of photosensitizers include thioxanthone, anthracene, perylene, phenothiazione, 1,2-benzathracene coronene, pyrene and tetracene. The photoinitiator and photosensitizer are chosen to be compatible with the polymer being crosslinked and the light source available.

Radiation induced cationic curing may also be done in combination with free radical curing. Free radical curing can be further enhanced by the addition of additional free radical photoinitiators and photosensitizers for them.

Reactive (radiation curable) diluents that can be added to the polymer include alcohols, vinyl ethers, epoxides, acrylate and methacrylate monomers, oligomers and polymers. They may also be blended with other dienebased polymers. Examples of epoxides include bis(2,3-epoxy cyclopentyl)ether (Union Carbide EP-205), vinyl cyclohexene dioxide, limonene dioxide, epoxidized soya and linseed oils and fatty acids.

The crosslinked materials of the present invention are useful in adhesives (including pressure sensitive adhesives, contact adhesives, laminating adhesives and assembly adhesives), sealants, coatings, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the curing agent. However, in most coating and sealant applications, suitable formulations would also contain various combinations of resins, plasticizers, fillers, solvents, stabilizers and other ingredients such as asphalt. The following are some typical examples of formulations for coatings and sealants.

In the radiation crosslinked compositions of the present invention, including adhesives, coatings and sealants, it is necessary to add an adhesion promoting or tackifying resin that is compatible with the polymer. The prior art, as exemplified by U.S. Pat. No. 4,135,037, teaches that hydrogenated rosins, esters of rosins and other rosin materials are very compatible with epoxidized diene polymers. This indeed appears to be true. However, the prior art evidently did not attempt to radiation crosslink the compositions described including epoxidized diene polymers and rosin tackifying resins. The Applicants herein have found that rosin materials interfere with the cure of the composition and thus were not well suited for use in the radiation crosslinked compositions of the present invention.

The Applicants herein have found that terpene tackifying resins are very compatible with the epoxidized polymers used in the present invention and give the desired advantages of a tackifying resin without interfering with the radiation curing of the composition. Thus, the Applicants herein provide that their composition must include a terpene tackifying resin. Terpene tackifying resins include terpene itself ($C_{10}H_{16}$) which is an unsaturated hydrocarbon occurring in most essential oils and oleo resins of plants. The terpenes are based on the isoprene unit $H_2C=C(CH_3)-C(H)=CH_2$ and may be either acyclic or cyclic with one or more benzenoid groups. They are classified as monocyclic (dipentene), dicyclic (pinene), or acyclic (myrcene). Also included are styrenated terpenes and polyterpene resins. Specific examples of commercially available polyterpenes which can be used herein are Piccolyte® A115, A125 and A135 resins made by Hercules which are produced from the terpene monomer α-pinene and the Zonatac® styrenated terpene resins made by Arizona. The terpene resins will generally be used in the range of 20 to 400 parts of terpene resin per 100 parts of polymer (by weight), preferably 30 parts to 200 parts.

Epoxidized terpenes may also be used in the present invention as the tackifying resin. Terpenes may be epoxidized in the same manner as the polymer is epoxidized. The epoxidized terpenes work as well as unepoxidized terpenes and in some cases it appears that there are advantages to using epoxidized terpenes.

End block reinforcing resins may be used in these compositions if the epoxidized polymer contains a vinyl aromatic block. Aromatic resins may be employed, provided that they are compatible with the particular polymer used in the formulation. Normally, the resin should have a softening point above about 100° C., as determined by ASTM method E 28, using a ring and ball apparatus. Mixtures of aromatic resins having high and low softening points may also be used. Useful resins include coumaroneindene resins, polystyrene resins, vinyl toluene-alpha methylstyrene copolymers and polyindene resins. The amount of aromatic end block resin varies from 20 to 150 phr.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

If the coating or sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% w in the solvent blend.

Additional stabilizers known in the art may also be incorporated into the adhesive composition. These may be for protection during the life of the article against, for example, oxygen, ozone and ultra-violet radiation. However, these additional stabilizers should be compatible with the essential stabilizers mentioned hereinabove and their intended function as taught herein.

| Ingredient | Amount (parts per 100 rubber-phr) |
|---|---|
| Typical Adhesive Composition | |
| Polymer | 100 |
| Tackifying resin | 20 to 400 |
| Oil | 0 to 100 |
| Typical Coating Composition | |
| Polymer | 100 |
| Tackifying resin | 20 to 400 |
| Pigment | 0 to 300 |
| Curing agent | 0 to 100 |
| Reactive diluent | 0 to 200 |
| Solvent | 0 to 300 |
| Typical Sealant Composition | |
| Polymer | 100 |
| Tackifying resin | 20 to 400 |
| Endblock reinforcing resin | 0 to 150 |
| Pigment | 0 to 300 |
| Curing agent | 0 to 100 |
| Reactive diluent | 0 to 100 |
| Solvent | 0 to 300 |

The adhesive, coating and sealant compositions of the present invention are typically prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then preferably be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive can consist of simply the epoxidized polymer or, more commonly, a formulated composition containing a significant portion of the epoxidized polymer along with other known adhesive composition components. A preferred method of application will be hot melt application at a temperature around or above 100° C. because hot melt application at a temperature around or above 100° C. because hot melt application above 100° C. minimizes the presence of water and other low molecular weight inhibitors of cationic polymerization. The adhesive can be heated before and after cure to further promote cure or post cure. Radiation cure of hot adhesive is believed to promote faster cure than radiation cure at lower temperatures.

Preferred uses of the present formulation are the preparation of pressure-sensitive adhesive tapes and the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for adhesives that do not tear paper and molded goods and the like.

Coating compositions are useful for strippable coatings for protecting metal products prior to use, high friction coatings, waterproofing coatings, shatter retentive coatings, coating for optical fibers, etc. Sealant compositions are useful for insulated glass windows, construction sealants, corrosion protective sealants (i.e. weldable sealants for the automotive industry, etc.), etc.

EXAMPLE 1

The purpose of the experiments described in this example is to determine the compatibility of various types of tackifying resins with an epoxidized polymer and the curability of this polymer with various resins. The epoxidized polymer used in this example is an epoxidized isoprene/butadiene star polymer having an arm molecular weight of 5800, approximately 17 arms and an epoxy content of 1.7 Meq/g of polymer.

Two terpene resins were used. The first was Piccolyte® A115 terpene resin produced from the terpene monomer α-pinene from Hercules Incorporated. The second was Zonatac® 105L thermoplastic modified terpene hydrocarbon resin from Arizona Chemical Company. The rosin tackifying resin used was Foral® 85 rosin ester resin. An unsaturated synthetic $C_5$ hydrocarbon resin was also used. This is Wingtack® 95 resin which is a diene-olefin copolymer of piperylene and 2-methyl-2-butene having a softening point of about 95° C. A similar unsaturated resin, Piccotac® 95 resin was also used.

For each of the resins, a small amount of solution consisting of 50 percent resin and 50 percent polymer was made at 60 percent solids in toluene. Three samples of each blend were prepared by placing an amount about 2 centimeters in diameter on a Mylar film and drying them. One sample was not cured. One sample was cured using 3 Mrads of electron beam radiation. One percent by weight of solids of Cyracure UVF 6974, an aryl sulfonium salt, a photoinitiator made by Union Carbide, was added to the third sample which was then cured using ultraviolet radiation at 30 feet per minute. The UV curing device consists of a conveyor belt which transports the sample through the radiation exposure chamber at the desired speed. In this case, the sample was exposed to UV radiation by a medium pressure mercury lamp at a power of 200 watt per inch for about 9 to 10 seconds. The results of the compatibility experiments are shown in Table 1 below.

TABLE 1

| Cure | Piccotac 95 | Wingtack 95 | Piccolyte A115 | Zonatac 105L | Foral 85 |
|---|---|---|---|---|---|
| — | (1) cloudy, wrinkled surface, bubbles | (2) slightly cloudy, wrinkled surface, bubbles | (3) clear smooth with some bubbles | (4) clear smooth | (5) clear smooth |
| EB | (6) slightly cloudy, wrinkled surface | (7) wrinkled surface, fairly clear | (8) smooth clear | (9) smooth clear | (10) smooth clear, gooey |
| UV (30 fpm) | (11) cloudy, wrinkled surface | (12) slightly cloudy, wrinkled surface | (13) slightly cloudy smooth surface | (14) clear smooth | (15) clear smooth, gooey |

The following are additional observations of the electron beam cured samples. Numbers 6 and 7 had very little tack and were harder. Number 8 had a smooth surface with a slight range peel texture and was sticky to the touch. Number 9 was very sticky, had an smooth surface with a slight orange peel texture Number 10 was very soft, somewhat gooey and was sticky. No residue was left on the finger after touching any of the samples.

The conclusions to be drawn from the above data for electron beam irradiation are as follows. The synthetic unsaturated resins in samples 6 and 7 were not compatible with the epoxidized polymer and the blend was not sticky. The terpene resins in samples 8 and 9 were compatible with the epoxidized polymer and the blend was sticky. The rosin resin of sample 10 was compatible with the epoxidized resin but the blend did not cure to form a cohesive film.

The following are additional observations on the uncured samples. Number 1 was soft and sticky but not gooey. Number 2 was soft, sticky and slightly gooey. Some of the blend stuck to the finger when it was touched. Number 3 wherein a terpene resin was used was soft and sticky to the touch. A fingerprint impression was left. Number 4 using another terpene resin was soft, sticky and somewhat gooey. Some of the blend stuck to the finger when touched. Number 5 using the rosin resin was gooey and sticky.

The following are the conclusions concerning the ultraviolet cured samples. 11 and 12, using the synthetic unsaturated resins, were not compatible op sticky. 13 and 14, using the terpene resins were compatible and sticky. Number 15, using the rosin resin, was compatible but did not cure to form a cohesive film.

It can be seen that the results of the above experiments indicate that the terpene resins will produce good radiation curing of the epoxidized diene polymer as well as being very compatible with it but that the rosin resin was unacceptable because the blends using it did not cure either with electron beam or with ultraviolet. This is likely because the rosin resin interferes with the radiation curing.

EXAMPLE 2

The purpose of the experiments recorded in this example is to determine the effect of various resins on the curability of epoxidized isoprene polymers. The radiation dose used in these experiments is different from that used in Example 1 but the rest of the procedure was exactly the same. The electron beam dose was 4 Mrads and the ultraviolet cure was carried out at 60 feet per minute. The polymer used in this example was an epoxidized isoprene star polymer with an arm molecular weight of 6800, about 21 arms and an epoxy content of 1.7 Meq/g of polymer. The samples are described in Table 2 below.

TABLE 2

| Resin | EB Cure (4 Mrad) | (1% Cyracure) UV Cure (60 fpm) |
|---|---|---|
| Zonatac 105L | 1 | 6 |
| Piccotac 95 | 2 | 7 |
| Wingtack 95 | 3 | 8 |
| Foral 85 | 4 | 9 |
| Piccolyte A115 | 5 | 10 |

Of the electron beam irradiated samples, only numbers 1 and 5, the samples using terpene resins, produced good results. Number 5 was tacky and left no residue on the finger. Number 1 was tacky and left no residue on the finger. Number 3, using one of the unsaturated resins has almost no tack, and the other sample using an unsaturated resin, number 2, was only very slightly tacky. Number 4, using the rosin resin was only very slightly cured. A residue was left on the finger when touched.

Of the ultraviolet cured samples, only number 10 had very good results. This sample was made using one of the terpene resins and it was tacky and nicely cured. There was no residue on the finger when it was touched. The samples with the unsaturated resins, 7 and 8, had almost no tack and no tack, respectively. Sample 9, using the rosin resin was very tacky, soft and a fingerprint was left in the adhesive. There was some residue on the finger. Number 6, the other sample with the terpene resin, had similar results to 9. It is thought that this blend using the terpene resin did not produce good results because the styrene in the Zonatac 105 absorbs some of the UV radiation resulting in a lower effective dose. This may be compensated by adding a short postbake (10 minutes @ 121° C.) after irradiation.

Samples 6 and 9, which did not cure on the first pass through the UV, were given a second pass after which both samples were cured. In this case, the styrene modified terpene resin only offers an advantage over the rosin ester for electron beam curing, but not for UV. However the unmodified terpene resin (Piccolyte A115) demonstrates an advantage for both.

EXAMPLE 3

A base polymer (isoprene-butadiene-isoprene (I-B-I) of molecular weights 21,000–84,000–20,000 at 32.8% polyisoprene) was prepared by anionic polymerization in cyclohexane, using sec-butyl lithium as the initiator, using the dihalohydrocarbon coupling method described in U.S. Pat. No. 3,607,982 which is herein incorporated by reference. By charge weight the polymer contained 32.8% isoprene and 67.2% butadiene. GPC measurements indicated we achieved 20,100–44,000 for the diblock. After coupling, the GPC measurement indicated a coupling efficiency of 79% was achieved and the peak molecular weight of the coupled polymer was 25,000. This polymer was identified as Polymer 1. Polymers 2 to 5 are epoxidized versions of Polymer 1.

| Polymer: | 2 | 3 | 4 | 5 |
|---|---|---|---|---|
| Target Meq epoxy/g | 0.50 | 4.85 | 4.85 | 4.85 |
| % polymer in cement | 10 | 4.24 | 4.2 | 10 |
| Reaction temperature | 28–33° C. | 26–36° C. | 22–37° C. | 22–33° C. |
| Reaction time after acid addition complete | 4 hr[a] | gelled[b] | 3 hr[c] | 3.5 hr |
| Recipe: | | | | |
| Polymer 1 (4727) | 250 | 112.36 | 21 | 79.3 |
| Cyclohexane | 2250 | 2537.64 | 479 | 0 |
| Methylenechloride | 0 | 0 | 0 | 713.7 |
| Anh. sodium carbonate | 0.59 | 2.56 | 52.48 | 110.96 |
| 35% peracetic acid | 27.14 | 118.33 | 22.12 | 83.57 |
| Anh. sodium carbonate | 76.68 | 334.31 | 10.48 | 0 |

[a] 3 hr. mix followed by 76.68 g Na$_2$CO$_3$ and 1 more hour mix.
[b] A batch gelled solid after 87% of the peracetic acid was added.
[c] A final 20% excess Na$_2$CO$_3$ (10.48 g) was added immediately after the peracetic acid was stopped and the batch was mixed for 3 hours.

Polymers 2–5 were epoxidized in glass reactors equipped with stirring blades and nitrogen blanketing. The peracetic acid was slowly dripped in to control the exotherms. Water/ice baths were used to provide additional control.

In the preparation of Polymer 2, a small amount of anhydrous sodium carbonate was used to neutralize the small amount of sulfuric acid found in the 35% peracetic acid purchased from FMC Corp. The last anhydrous sodium hydroxide addition was to neutralize all of the acid in the system and remove any water. The polymer cement was separated from the sodium carbonate/acetate by filtration. The polymer was subsequently recovered from the cement by coagulation with isopropanol and dried in a vacuum oven. Using the same synthesis procedure to prepare Polymer 3 resulted in complete gelation of the batch before all of the peracetic acid could be added and the material had to be discarded.

In Polymer 4, 52 grams of sodium carbonate was added in four ¼ additions followed by ¼ additions of the peracetic acid, so that the acid could be neutralized on a mole to mole basis by the Na$_2$CO$_3$. Some 20 mole % extra Na$_2$CO$_3$ was added immediately after the acid addition. These measures prevented gelation but epoxidation was poor, as will be seen. Polymer 4 was discarded, after taking a small sample for proton NMR analysis.

Before preparing Polymer 5, some of Polymer 1 was dried to remove the cyclohexane and was redissolved in methylene chloride to attempt epoxidation. Enough Na$_2$CO$_3$ was added to the cement to neutralize all of the acid by adding in a 1:1 molar basis. The polymer cement was separated from the Na$_2$CO$_3$ by filtration and removed by hot water coagulation and dried since it would not coagulate by addition of IPA because of its substantially different polarity.

Proton NMR analysis on the polymers before and after epoxidation gave the following breakdown of mer (olefinic double bonds) and epoxy concentrations in the polymers.

| Source | Meq per Gram of Final Polymer (Except for Polymer 1) | | | |
|---|---|---|---|---|
| | Polymer 1 | Polymer 2 | Polymer 4 | Polymer 5 |
| 1,4-isoprene | 4.62 | 4.18 | 2.69 | 1.86 |
| 3,4-isoprene | 0.39 | 0.34 | 0.31 | 0.29 |
| 1,4-butadiene | 11.22 | 11.08 | 10.46 | 9.20 |
| 1,2-butadiene | 0.96 | 0.97 | 0.91 | 0.82 |
| Epoxide | 0.00 | 0.49 | 2.22 | 3.94 |

The data for Polymers 2, 4 and 5 in the above table must be adjusted to take into account the weight gain from epoxidation before they can be directly compared to the data on the original polymer (Polymer 1). The adjusted values are given in the table below along with the delta's.

| Source | Polymer 1 | Polymer 2 | Polymer 4 | Polymer 5 |
|---|---|---|---|---|
| | Meq per gram of original polymer | | | |
| 1,4-isoprene | 4.62 | 4.21 | 2.79 | 1.99 |
| 3,4-isoprene | 0.39 | 0.34 | 0.32 | 0.31 |
| 1,4-butadiene | 11.22 | 11.17 | 10.85 | 9.82 |
| 1,2-butadiene | 0.96 | 0.98 | 0.94 | 0.88 |
| epoxide | 0.00 | 0.49 | 2.30 | 4.20 |
| Delta's - Change in Meq per gram of original polymer | | | | |
| 1,4-isoprene | | −0.41 | −1.83 | −2.63 |
| 3,4-isoprene | | −0.05 | −0.07 | −0.08 |
| 1,4-butadiene | | −0.05 | −0.37 | −1.40 |
| 1,2-butadiene | | +0.02 | −0.02 | −0.08 |
| epoxide | | +0.49 | +2.30 | +4.20 |

| | Formulation | | |
|---|---|---|---|
| | A | B | C |
| Polymer 1 (0 Meq/g) | 49.5 | 0 | 0 |
| Polymer 2 (0.49 Meq/g) | 0 | 49.5 | 0 |
| Polymer 5 (3.94 Meq/g) | 0 | 0 | 49.5 |
| Piccolyte A-115* | 49.5 | 49.5 | 49.5 |
| UVI 6974** | 1.0 | 1.0 | 1.0 |
| Tetrahydrofuran | 150 | 150 | 150 |

*A terpene tackifying resin from Hercules
**A cationic photoinitiator from Union Carbide Films of each formulation were cast on 1 mil polyester film to give 2 mils of adhesive when dry. Properties were tested both before and after cationic cure. UV cured samples were prebaked for 2 minutes at 121° C. immediately before UV curing in the same apparatus used in the patent examples at 30 feet per minute to simulate hot melt application.

| Formulation | Polymer Gel (%) | Loop Tack (oz/in) | Polyken Probe Tack (Kg) | 180° C. Peel from Steel (pli) | 23° C.* Holding Power to Steel (min) | 95° C.** Holding Power to Mylar (min) |
|---|---|---|---|---|---|---|
| Results of Adhesive Property Testing | | | | | | |
| No Curing (A only prebaked 2 min. at 121° C.) | | | | | | |
| A | 1 | 64C | 0.81C | 1.6C | 2C*** | 2C |
| B | 0 | 95C | 1.23C | 2.5C | 0C | 0C |
| C | 7 | 0+ | 0+ | 0+ | 0+ | 0+ |
| | 7 | 0 | .176 | 3.9C | 101C | 23C |
| (A later retest of C was subjectively evaluated at halfway in between these 2 tests) | | | | | | |
| UV Cure (30 fpm) + 10 min. 121° C. postbake | | | | | | |
| A | 1 | 79C | 0.77C | 1.6C | 0C | 0C |
| B | 104 | 47 | 1.22 | 2.2 | >6800 | >1000 |
| C | 106 | 0+ | 0+ | 0+ | 0+ | 0+ |

*½ in × ½ in overlap with 2 Kg weight
**1 in × 1 in overlap with 1 Kg weight
***used a 1 Kg weight
+could not make a bond
C means failure was cohesive, leaving adhesive on both substrates, which is not desirable for a PSA adhesive The results show that formulation B that is cured gives good PSA properties. Without cure none of the polymers provide sufficient cohesive strength to prevent cohesive failure from occurring during tack, peel and shear testing. Additionally, shear resistance is nonexistent. After UV and postbake curing, formulation A, containing Polymer 1 with no epoxy, is unchanged, whereas formulation B, containing Polymer 2 with 0.49 Meq/g of epoxy, has good cohesive strength and is fully gelled to make it solvent insoluble and give it high temperature (95° C.) shear resistance. Formulation C, containing Polymer 4 with 3.94 Meq/g of epoxy, is overcured and will not bond; hence it has zero tack, peel and shear resistance—i.e., it is not useful as an adhesive.

We claim:

1. A radiation cured composition which is curable at low levels of radiation comprising a crosslinked unsaturated epoxidized diene polymer containing 0.1 to 3 milliequivalents of epoxide per gram of polymer and an epoxidized terpene tackifying resin.

2. The composition of claim 1 wherein the terpene resin comprises from 20 to 100 parts of polymer.

* * * * *